(12) United States Patent
Sosa (10) Patent No.: US 10,264,892 B1
(45) Date of Patent: Apr. 23, 2019

(54) SOFA CADDY

(71) Applicant: Jesus Sosa, Alhambra, CA (US)

(72) Inventor: Jesus Sosa, Alhambra, CA (US)

(*) Notice: Subject to any disclaimer, the term of this patent is extended or adjusted under 35 U.S.C. 154(b) by 0 days.

(21) Appl. No.: 15/926,031

(22) Filed: Mar. 20, 2018

(51) Int. Cl.
*A47C 7/62* (2006.01)
*F16M 13/02* (2006.01)

(52) U.S. Cl.
CPC ............... *A47C 7/62* (2013.01); *F16M 13/02* (2013.01); *F16M 2200/04* (2013.01)

(58) Field of Classification Search
CPC .... A47C 7/62; A47C 7/68; A47C 7/70; F16M 13/02; F16M 2200/04; B60N 2/468; B60N 2/4686; B60N 3/102; B60N 3/103; B60R 2011/0014; A45C 2011/001; A45C 2011/002
USPC ............... 211/119.007; 312/235.2; 248/910; 297/188.06, 188.05, 188.14, 188.15, 297/188.16, 188.18, 188.2, 188.21; D3/304, 313, 315; D7/620; D16/416; 206/320
See application file for complete search history.

(56) References Cited

U.S. PATENT DOCUMENTS

| | | | | |
|---|---|---|---|---|
| 1,725,508 A | * | 8/1929 | Bell-Clifford | A24F 19/0007 108/47 |
| 1,738,557 A | * | 12/1929 | Beiling | A24F 19/0007 131/231 |
| 3,278,008 A | * | 10/1966 | Larkin | B60N 3/08 224/540 |
| 3,717,188 A | * | 2/1973 | Green | B60R 7/088 206/387.15 |
| 3,804,233 A | * | 4/1974 | Gregg, Jr. | B60N 3/103 206/387.15 |
| 3,967,666 A | * | 7/1976 | Farrar | A61G 7/0503 383/7 |
| 5,605,235 A | * | 2/1997 | Johnson | F16M 13/00 211/26.1 |
| 5,692,608 A | * | 12/1997 | Simien | A47C 7/62 206/320 |
| 5,872,702 A | * | 2/1999 | Kopel | H01H 9/025 174/535 |
| 5,911,472 A | * | 6/1999 | Toth | A47C 7/62 297/188.14 |
| D421,543 S | * | 3/2000 | Rogman | D6/610 |
| D492,114 S | * | 6/2004 | Sulier | D3/315 |

(Continued)

FOREIGN PATENT DOCUMENTS

WO 09836667 A 8/1998

*Primary Examiner* — Jennifer E. Novosad (57) ABSTRACT

The sofa caddy is a storage apparatus. The sofa caddy is configured for use with a chair. The chair is further defined with a manchette, a bench, and a cushion. The bench is a horizontal support surface formed by the chair. The cushion is a padding structure that: 1) rests on the bench; and 2) is placed against the manchette. The manchette is a vertical structure that prevents the cushion from sliding off of the bench. The sofa caddy removably attaches to the chair. The sofa caddy comprises a base sheeting, a plurality of pockets, and a counterweight. The plurality of pockets and the counterweight attach to the base sheeting. The counterweight inserts between the cushion and the manchette to secure the soda caddy to the chair. The base sheeting drapes over the manchette of the chair. The plurality of pockets store the one or more domestic articles.

12 Claims, 4 Drawing Sheets

(56) References Cited

U.S. PATENT DOCUMENTS

| | | | | |
|---|---|---|---|---|
| 7,264,127 | B2 * | 9/2007 | Jones | A47J 47/16 |
| | | | | 206/320 |
| 7,284,791 | B1 * | 10/2007 | Wright | A47C 7/62 |
| | | | | 206/320 |
| 7,506,758 | B2 * | 3/2009 | Davis-Garrison | A47C 7/68 |
| | | | | 206/320 |
| 7,642,912 | B2 | 1/2010 | Sholem | |
| D627,168 | S * | 11/2010 | Cooney | D3/304 |
| D651,767 | S * | 1/2012 | Dias | D30/153 |
| D689,282 | S * | 9/2013 | Lindeman | D3/231 |
| D711,106 | S * | 8/2014 | Davidson | D3/303 |
| 8,875,883 | B2 * | 11/2014 | Kinskey | B25H 3/021 |
| | | | | 206/373 |
| 9,095,222 | B2 * | 8/2015 | Asaf | A47C 21/00 |
| 2002/0018601 | A1 * | 2/2002 | Nelson | A47C 21/003 |
| | | | | 383/7 |
| 2004/0261175 | A1 * | 12/2004 | May | A47C 7/62 |
| | | | | 5/503.1 |
| 2009/0199338 | A1 * | 8/2009 | House | A47C 7/62 |
| | | | | 5/503.1 |
| 2015/0028029 | A1 * | 1/2015 | Scott | A47C 19/22 |
| | | | | 220/23.8 |
| 2015/0061332 | A1 * | 3/2015 | Dowell | A47C 7/383 |
| | | | | 297/188.01 |
| 2016/0007735 | A1 | 1/2016 | Gallup | |
| 2016/0059992 | A1 * | 3/2016 | Pierre-Pipkin | A47C 7/62 |
| | | | | 220/500 |

* cited by examiner

SOFA CADDY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including chairs and accessories for a chair, more specifically, a storage apparatus that removably attaches to a chair.

SUMMARY OF INVENTION

The sofa caddy is a storage apparatus. The sofa caddy is configured for use with one or more domestic articles. The one or more domestic articles are stored in the sofa caddy. The sofa caddy is configured for use with a chair. The chair is further defined with a manchette, a bench, and a cushion. The bench is a horizontal supporting surface formed by the chair. The cushion is a padding structure that: 1) rests on the bench; and 2) is placed against the manchette. The manchette is a vertical structure that prevents the cushion from sliding off of the bench. The sofa caddy removably attaches to the chair. The sofa caddy comprises a base sheeting, a plurality of pockets, and a counterweight. The plurality of pockets and the counterweight attach to the base sheeting. The counterweight inserts between the cushion and the manchette to secure the soda caddy to the chair. The base sheeting drapes over the manchette of the chair. The plurality of pockets store the one or more domestic articles.

These together with additional objects, features and advantages of the sofa caddy will be readily apparent to those of ordinary skill in the art upon reading the following detailed description of the presently preferred, but nonetheless illustrative, embodiments when taken in conjunction with the accompanying drawings.

In this respect, before explaining the current embodiments of the sofa caddy in detail, it is to be understood that the sofa caddy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sofa caddy.

It is therefore important that the claims be regarded as including such equivalent construction insofar as they do not depart from the spirit and scope of the sofa caddy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
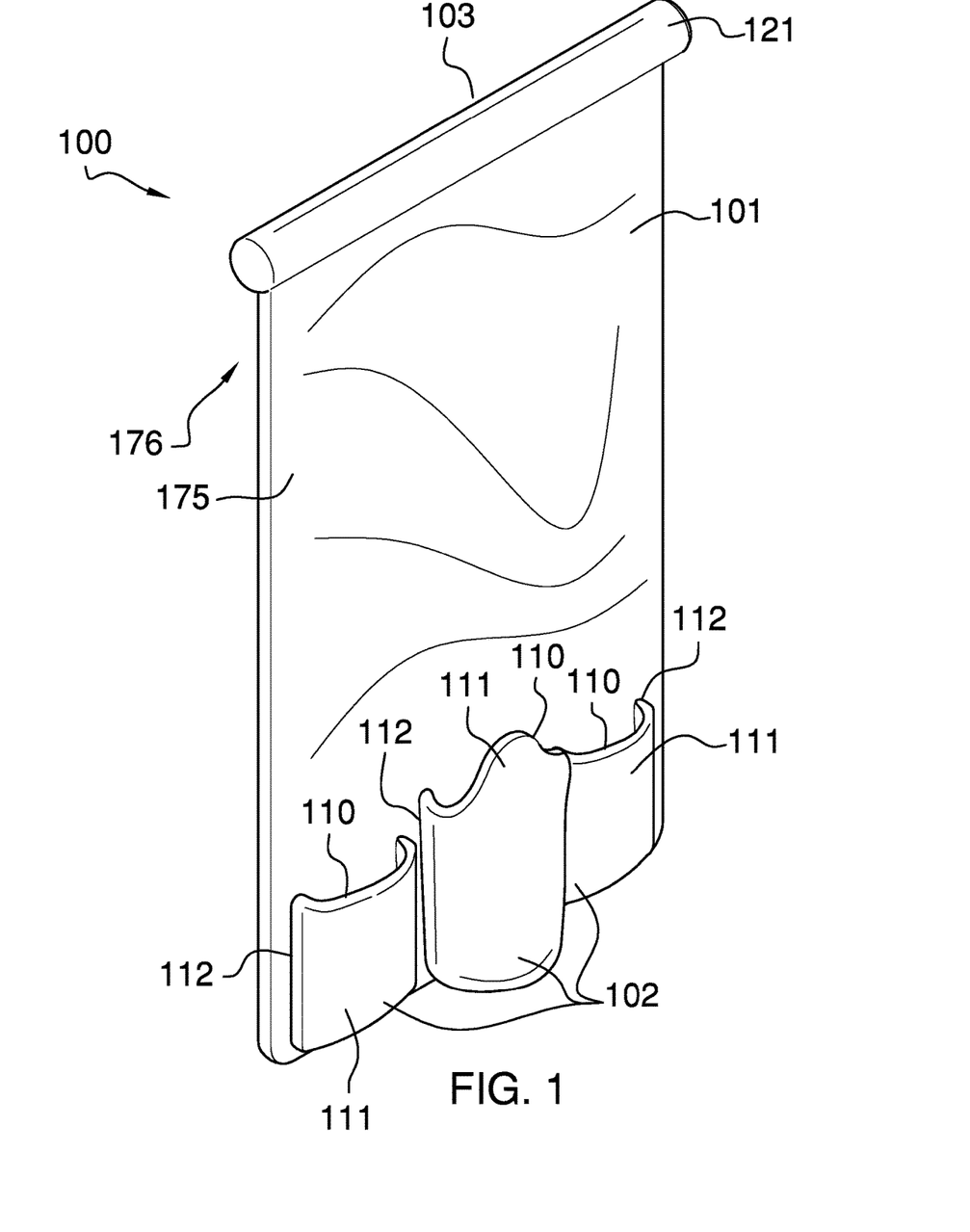
FIG. 1 is a perspective view of an embodiment of the disclosure.
Figure 2:
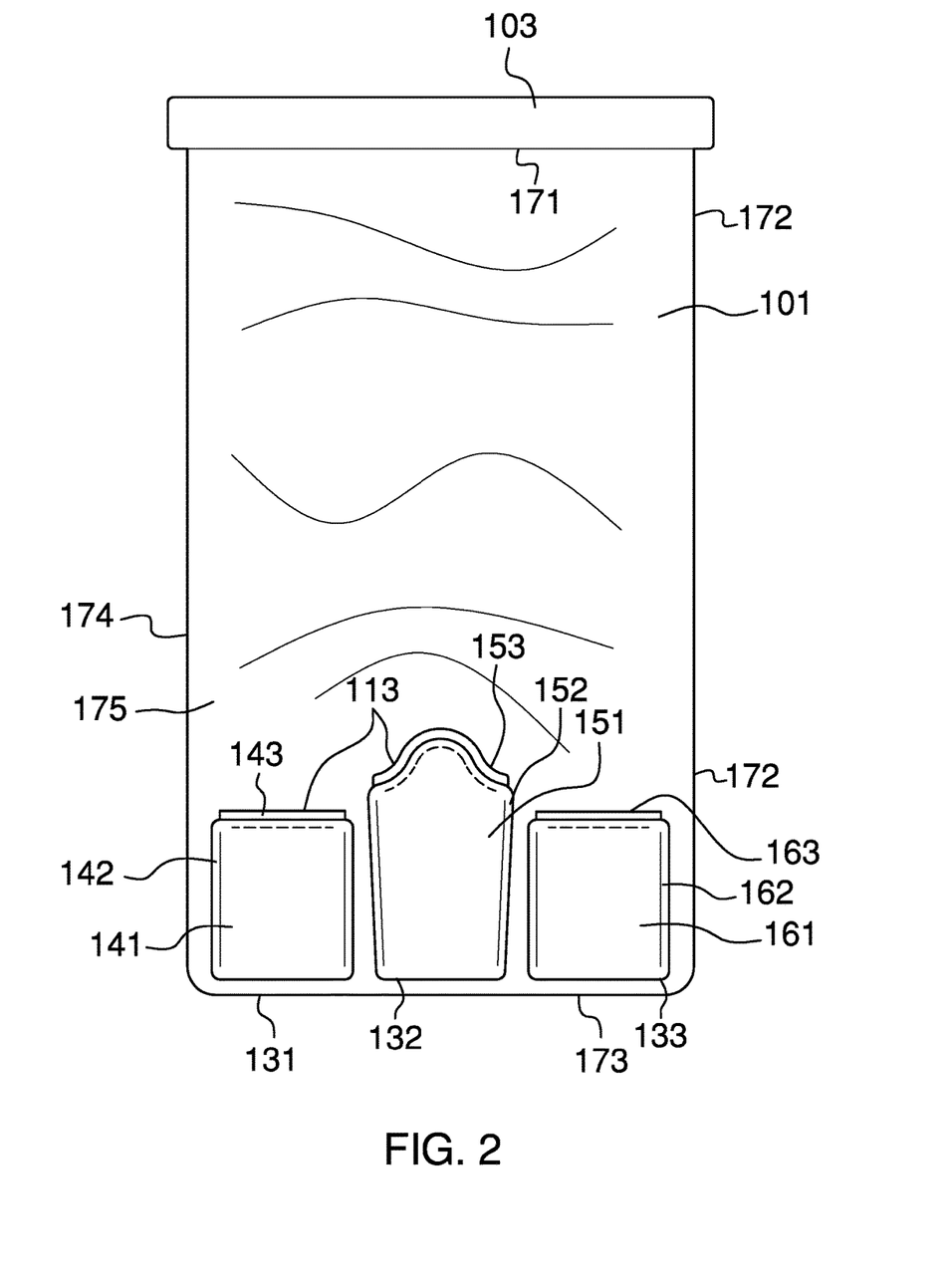
FIG. 2 is a front view of an embodiment of the disclosure.
Figure 3:
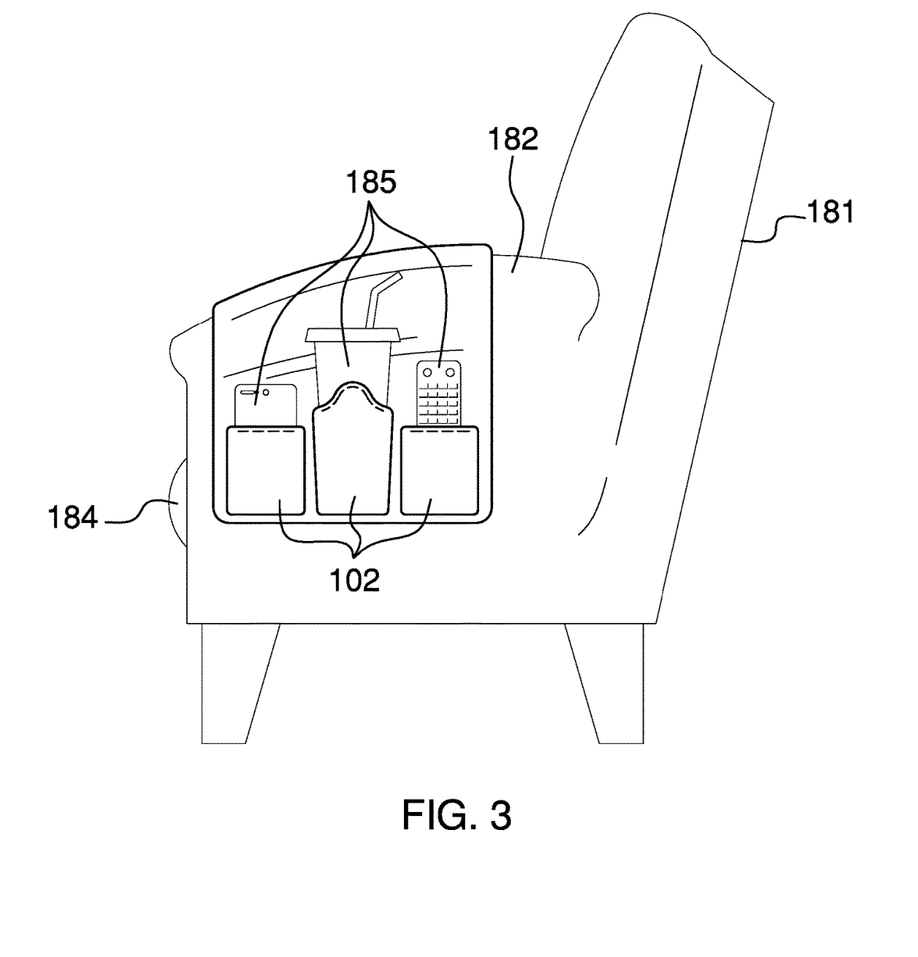
FIG. 3 is an in-use view of an embodiment of the disclosure.
Figure 4:
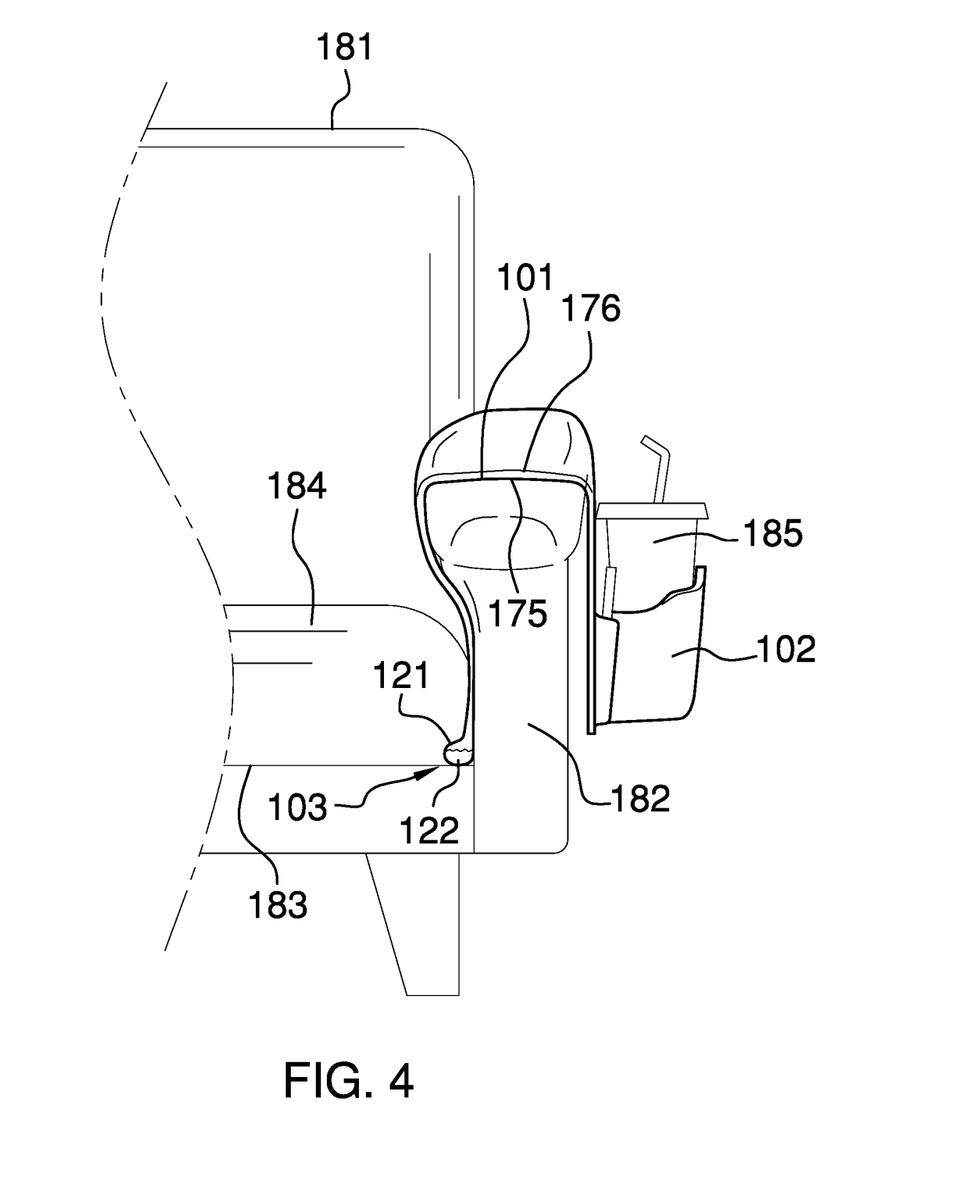
FIG. 4 is an in-use view of an embodiment of the disclosure.

Detailed reference will now be made to one or more potential embodiments of the disclosure, which are illustrated in FIGS. 1 through 4.

The sofa caddy 100 (hereinafter invention) is a storage apparatus. The invention 100 is configured for use with one or more domestic articles 185. The one or more domestic articles 185 are stored in the invention 100. The invention 100 is configured for use with a chair 181. The chair 181 is further defined with a manchette 182, a bench 183, and a cushion 184. The bench 183 is a horizontal support surface formed by the chair 181. The cushion 184 is a padding structure that: 1) rests on the bench 183; and 2) is placed against the manchette 182. The manchette 182 is a vertical structure that prevents the cushion 184 from sliding off of the bench 183. The invention 100 removably attaches to the chair 181. The invention 100 comprises a base sheeting 101, a plurality of pockets 102, and a counterweight 103. The plurality of pockets 102 and the counterweight 103 attach to the base sheeting 101. The counterweight 103 inserts between the cushion 184 and the manchette 182 to secure the soda caddy to the chair 181. The base sheeting 101 drapes over the manchette 182 of the chair 181. The plurality of pockets 102 store the one or more domestic articles 185.

The base sheeting 101 is a textile-based sheeting material. The base sheeting 101 is cut in a rectangular shape. The base sheeting 101 forms the primary structure of the invention 100 that is draped over the manchette 182 of the chair 181. The base sheeting 101 is further defined with a first edge 171, a second edge 172, a third edge 173, a fourth edge 174, an exterior face 175, and an inferior face 176.

The first edge 171 is the edge of the base sheeting 101 with the shortest span of distance. The counterweight 103 attaches to the first edge 171 of the base sheeting 101. The second edge 172 is an edge of the base sheeting 101 that attaches the first edge 171 to the third edge 173. The third edge 173 is the edge of the base sheeting 101 that is distal from the first edge 171. The fourth edge 174 is the edge of the base sheeting 101 that is distal from the second edge 172. The exterior face 175 is the surface of the base sheeting 101 that is distal from the inferior face 176. The inferior face 176 is the surface of the base sheeting 101 that is proximal to the manchette 182 when the invention 100 drapes over the manchette 182.

Each of the plurality of pockets 102 is a containment space formed on the exterior face 175 of the base sheeting 101. The plurality of pockets 102 are sized to receive a domestic article selected from the one or more domestic articles 185. The plurality of pockets 102 are positioned such that the opening into any pocket selected from the plurality of pockets 102 faces the center of the base sheeting 101. The design and use of a pocket are well-known and documented in the apparel and textile arts.

The plurality of pockets 102 comprises a collection of individual pockets 110. Each individual pocket 110 is a storage space formed on the exterior face 175 of the base sheeting 101. Each individual pocket 110 stores a domestic article selected from the one of more domestic articles 185. Each individual pocket 110 is positioned on the base sheeting 101 such that the opening used for access into the individual pocket 110 faces the counterweight 103. By faces is meant that the opening into the individual pocket 110 is proximal to the counterweight 103. Each individual pocket 110 comprises a pocket sheeting 111, a pocket seam 112, and a pocket lasting 113.

The pocket sheeting 111 is a sheeting that attaches to the exterior face 175 of the base sheeting 101. The pocket sheeting 111 forms the exterior surface of each individual pocket 110 such that the domestic article selected from the one or more domestic articles 185 is contained in the space between the pocket sheeting 111 and the base sheeting 101.

The pocket seam 112 is a seam that attaches the pocket sheeting 111 to the exterior surface of the base sheeting 101. The closure formed by each pocket seam 112 creates the first link of the load path the supports the domestic article selected from the one or more domestic articles 185 within the individual pocket 110 when the plurality of pockets 102 are suspended from the manchette 182 of the chair 181. The use of a seam to attach a second sheeting to a first sheeting is well-known and documented in the textile and apparel arts.

The pocket lasting 113 a plastic structure. The pocket lasting 113 is permanently molded with an arcuate shape when viewed from the edge. The pocket lasting 113 is a lasting that is inserted between the base sheeting 101 and the pocket sheeting 111. The pocket lasting 113 separates the base sheeting 101 from the pocket sheeting 111 to hold the individual pocket 110 in a permanently open position.

Each of the plurality of pockets 102 attaches to the exterior face 175 of the base sheeting 101 such that the plurality of pockets 102 are on the opposite side of the manchette 182 from the counterweight 103 when the invention 100 drapes over the manchette 182 of the chair 181.

The counterweight 103 is a prism-shaped structure. The counterweight 103 is a weighted structure that holds the invention 100 in a fixed position on the chair 181. The counterweight 103 secured in position in the chair 181 by wedging the counterweight 103 between the cushion 184 and the manchette 182 of the chair 181. The counterweight 103 comprises a shell 121 and a granular material 122.

The shell 121 is a prism-shaped structure. The shell 121 is a weighted structure that counterbalances the weight of the one or more domestic articles 185 that are stored in the plurality of pockets 102. The mass of the shell 121 is determined based on the anticipated load presented by the one or more domestic articles 185. In the first potential embodiment of the disclosure, the shell 121 is hollow.

The granular material 122 is contained within the hollow interior of the shell 121. The granular material 122 provides the bulk of the mass used by the counterweight 103 to balance the load of the one or more domestic articles 185. In the first potential embodiment of the disclosure, the granular material 122 is selected from the group consisting of sand and clay.

In the first potential embodiment of the disclosure, the plurality of pockets 102 comprises a first pocket 131, a second pocket 132, and a third pocket 133. The first pocket 131 comprises a first pocket sheeting 141, a first pocket seam 142, and a first pocket lasting 143. The second pocket 132 comprises a second pocket sheeting 151, a second pocket seam 152, and a second pocket lasting 153. The third pocket 133 comprises a third pocket sheeting 161, a third pocket seam 162, and a third pocket lasting 163.

The first pocket 131 is an individual pocket 110. The first pocket sheeting 141 is the pocket sheeting 111 used to form the first pocket 131. The first pocket seam 142 is the pocket seam 112 used to form the first pocket 131. The first pocket lasting 143 is the pocket lasting 113 used to form the first pocket 131.

The second pocket 132 is an individual pocket 110. The second pocket sheeting 151 is the pocket sheeting 111 used to form the second pocket 132. The second pocket seam 152 is the pocket seam 112 used to form the second pocket 132. The second pocket lasting 153 is the pocket lasting 113 used to form the second pocket 132.

The third pocket 133 is an individual pocket 110. The third pocket sheeting 161 is the pocket sheeting 111 used to form the third pocket 133. The third pocket seam 162 is the pocket seam 112 used to form the third pocket 133. The third pocket lasting 163 is the pocket lasting 113 used to form the third pocket 133.

Each individual pocket 110 attaches to the exterior face 175 of the base sheeting 101 such that the span of the distance between the center of the individual pocket 110 and the first edge 171 is greater than the span of the distance between the center of the individual pocket 110 and the third edge 173.

The following definitions were used in this disclosure:

Arcuate: As used in this disclosure, arcuate describes the curve formed by a bent bow.

Bench: As used in this disclosure, a bench is a horizontal supporting surface formed by a chair.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a movable barrier structure that is in an orientation that prevents passage through a port or an aperture. The closed position is often referred to as an object being "closed."

Cushion: As used in this disclosure a cushion is a pad or pillow formed from soft material used for resting, sleeping, or reclining.

Domestic Article: As used in this disclosure, a domestic article is an item or object: 1) that is commonly found within a household; or, 2) that is commonly carried by a person. Examples of domestic articles include, but are not limited to, keys and key fobs, personal data devices, glasses, remote controls, or personal storage items such as purses, briefcases, wallets, or cases.

Drape: As used in this disclosure, to drape means to cover an object with a sheeting.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Granular Material: As used in this disclosure, a granular material is a material formed from an accumulation of discrete particles. While the discrete particles of the granular material are solid materials, in aggregate the physical performance of granular material will exhibit fluid characteristics.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Lasting: As used in this disclosure, a lasting refers to a first structure that inserts into a second structure such that the first structure maintains the second structure in a specific shape.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Manchette: As used in this disclosure, a manchette is a vertical structure formed on a chair. The manchette is often referred to as an arm.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pocket: As used in this disclosure, a pocket is a small pouch or storage space that is formed into an object. Pockets are often formed by joining a second textile or a second sheeting to a first textile or a first sheeting, respectively, by sewing or heat sealing respectively. Methods to form pockets are well-known and documented in the textile and apparel arts.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, a sheeting is a material, such as a textile, a plastic, or a metal foil, in the form of a thin flexible layer or layers.

Shell: As used in this disclosure, a shell is a structure that forms an outer covering intended to contain an object. Shells are often, but not necessarily, rigid or semi-rigid structures that are intended to protect the object contained within it.

Slide: As used in this disclosure, slide is a verb that refers to an object that is transported along a surface while in continuous contact with the surface. An object being transported along a surface with wheels cannot be said to be sliding.

Superior: As used in this disclosure, the term superior refers to a directional reference that is parallel to and in the opposite direction of the force of gravity.

Suspend: As used in this disclosure, to suspend an object means to support an object such that the inferior end of the object does not form a significant portion of the load path of the object.

Textile: As used in this disclosure, a textile is a material that is woven, knitted, braided or felted. Synonyms in common usage for this definition include fabric and cloth.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A storage apparatus comprising:
a base sheeting, a plurality of pockets, and a counterweight;
wherein the plurality of pockets and the counterweight attach to the base sheeting;
wherein the storage apparatus is configured for use with one or more domestic articles;
wherein the plurality of pockets are adapted to store the one or more domestic articles;
wherein the storage apparatus is configured for use with a chair;
wherein the storage apparatus is adapted to removably attach to the chair;
wherein the chair is further defined with a manchette, a bench, and a cushion;
wherein the counterweight is adapted to be inserted between the cushion and the manchette is adapted to secure the storage apparatus to the chair;
wherein the base sheeting is adapted to drape over the manchette of the chair;
wherein the base sheeting is a textile-based sheeting material;
wherein the base sheeting is cut in a rectangular shape;
wherein the base sheeting is further defined with a first edge, a second edge, a third edge, a fourth edge, an exterior face, and an inferior face;
wherein each of the plurality of pockets is a containment space formed on the exterior face of the base sheeting;
wherein the plurality of pockets comprises a collection of individual pockets;
wherein each of the plurality of pockets are sized to receive a domestic article selected from the one or more domestic articles;
wherein each individual pocket is formed on the exterior face of the base sheeting;
wherein each individual pocket stores a domestic article selected from the one or more domestic articles;
wherein the plurality of pockets are positioned such that an opening into any pocket selected from the plurality of pockets faces the center of the base sheeting;
wherein the counterweight is a weighted structure;
wherein the counterweight holds the storage apparatus in a fixed position on the chair;
wherein the counterweight is adapted to be secured to the chair by wedging the counterweight between the cushion and the manchette of the chair;
wherein each individual pocket comprises a pocket sheeting, a pocket seam, and a pocket lasting;
wherein the pocket seam attaches the pocket sheeting to the base sheeting;
wherein the pocket lasting inserts between the base sheeting and the pocket sheeting;
wherein the pocket sheeting forms the exterior surface of the individual pocket;
wherein the space between the pocket sheeting and the base sheeting is adapted to contain a domestic article selected from the one or more domestic articles.

2. The storage apparatus according to claim 1
wherein the pocket seam is a seam;
wherein the pocket seam attaches the pocket sheeting to the exterior surface of the base sheeting.

3. The storage apparatus according to claim 2
wherein the pocket lasting is a plastic structure;
wherein the pocket lasting is permanently molded with an arcuate shape;
wherein the pocket lasting separates the base sheeting from the pocket sheeting to hold the individual pocket in a permanently open position.

4. The storage apparatus according to claim 3 wherein each of the plurality of pockets attaches to the exterior face of the base sheeting such that the plurality of pockets are adapted to be on the opposite side of the manchette from the counterweight when the storage apparatus is adapted to be draped over the manchette of the chair.

5. The storage apparatus according to claim 4 wherein each individual pocket attaches to the exterior face of the base sheeting such that the span of the distance between the center of the individual pocket and the first edge is greater than the span of the distance between the center of the individual pocket and the third edge.

6. The storage apparatus according to claim 5
wherein the counterweight comprises a shell;
wherein the shell is a weighted structure.

7. The storage apparatus according to claim 6
wherein the counterweight further comprises a granular material;
wherein the shell is hollow;
wherein the granular material is contained within the hollow interior of the shell.

8. The storage apparatus according to claim 7
wherein the plurality of pockets comprises a first pocket and a second pocket and a third pocket;
wherein the first pocket is an individual pocket;
wherein the second pocket is an individual pocket.

9. The storage apparatus according to claim 8
wherein the first pocket comprises a first pocket sheeting, a first pocket seam, and a first pocket lasting;
wherein the second pocket comprises a second pocket sheeting, a second pocket seam, and a second pocket lasting;
wherein the third pocket comprises a third pocket sheeting, a third pocket seam, and a third pocket lasting;
wherein the first pocket sheeting is the pocket sheeting used to form the first pocket;

wherein the first pocket seam is the pocket seam used to form the first pocket;

wherein the first pocket lasting is the pocket lasting used to form the first pocket;

wherein the second pocket sheeting is the pocket sheeting used to form the second pocket;

wherein the second pocket seam is the pocket seam used to form the second pocket;

wherein the second pocket lasting is the pocket lasting used to form the second pocket.

10. The storage apparatus according to claim 9 wherein the third pocket comprises a third pocket sheeting, a third pocket seam, and a third pocket lasting;

wherein the third pocket is an individual pocket.

11. The storage apparatus according to claim 10 wherein the third pocket sheeting is the pocket sheeting used to form the third pocket;

wherein the third pocket seam is the pocket seam used to form the third pocket;

wherein the third pocket lasting is the pocket lasting used to form the third pocket.

12. The storage apparatus according to claim 11 wherein the granular material is selected from the group consisting of sand and clay.

\* \* \* \* \*